US008933957B2

(12) United States Patent
Kennedy

(10) Patent No.: US 8,933,957 B2
(45) Date of Patent: Jan. 13, 2015

(54) METHODS AND SYSTEMS FOR EMPHASIZING SELECTED AVIATION CHART INFORMATION

(75) Inventor: Brian B. Kennedy, Portland, OR (US)

(73) Assignee: The Boeing Company, Chicago, IL (US)

( * ) Notice: Subject to any disclaimer, the term of this patent is extended or adjusted under 35 U.S.C. 154(b) by 713 days.

(21) Appl. No.: 12/193,484

(22) Filed: Aug. 18, 2008

(65) Prior Publication Data

US 2010/0039438 A1   Feb. 18, 2010

(51) Int. Cl.
 G09G 5/02   (2006.01)
 G09B 29/00  (2006.01)

(52) U.S. Cl.
 CPC ............ *G09B 29/006* (2013.01); *G09B 29/007* (2013.01); *G09G 2380/12* (2013.01)
 USPC ........... 345/593; 345/589; 345/594; 340/945; 340/947; 342/33; 342/36; 701/15; 701/16; 701/17; 701/18

(58) Field of Classification Search
 None
 See application file for complete search history.

(56) References Cited

U.S. PATENT DOCUMENTS

| | | | | |
|---|---|---|---|---|
| 7,176,937 | B2* | 2/2007 | Gannon | 345/592 |
| 7,711,457 | B2* | 5/2010 | Caillaud | 701/5 |
| 8,019,491 | B1* | 9/2011 | McCusker | 701/4 |
| 8,130,238 | B2* | 3/2012 | Distler | 345/619 |
| 2007/0168120 | A1 | 7/2007 | Vandenbergh et al. | |
| 2007/0168122 | A1 | 7/2007 | Aspen | |
| 2008/0215234 | A1* | 9/2008 | Geelen | 701/200 |

FOREIGN PATENT DOCUMENTS

WO   2008079591 A1   7/2008

OTHER PUBLICATIONS

Thompson, T., et al.; Method and System for Dynamically Determining and Displaying Navigation Information; U.S. Appl. No. 11/868,812, filed Oct. 8, 2007; 19 pages.

* cited by examiner

*Primary Examiner* — Antonio A Caschera
(74) *Attorney, Agent, or Firm* — Armstrong Teasdale LLP

(57) ABSTRACT

Methods and systems for visually organizing aviation or aeronautical charts with color emphasis and de-emphasis features selected by a user.

14 Claims, 17 Drawing Sheets

| STRAIGHT-IN LANDING RWY 101 | | | | CIRCLE-TO-LAND | |
|---|---|---|---|---|---|
| ILS<br>DA(H) 293' (263') | | LOC (GS out)<br>C MO A(H) 480' (450') C | | | |
| FULL | RAIL or ALS out | RAIL out | ALS out | Max Kts | MO A(H) |
| A | RVR 24 or 1/2 | RVR 24<br>or 1/2 | RVR 40<br>or 3/4 | 90 | 720' (690') - 1 |
| B | RVR 40 or 3/4 | RVR 50<br>or 1 | RVR 50<br>or 1 | 120 | 740' (710') - 1 |
| C | | RVR 60<br>or 1 1/4 | RVR 60 or 1 1/4 | 140 | 740' (710') - 2 |
| D | | | 1 1/2 | 165 | 1020' (990') - 3 |

| | STRAIGHT-IN LANDING RWY 101 | | | CIRCLE-TO-LAND | |
|---|---|---|---|---|---|
| | ILS<br>DA(H) 293' (263') | | LOC (GS out)<br>MO A(H) 480' (450') | | MO A(H) |
| | FULL<br>RAIL or ALS out | | RAIL out | ALS out | Max Kts |
| A | RVR 24 or 1/2 | RVR 24<br>or 1/2 | RVR 40<br>or 3/4 | RVR 50<br>or 1 | 90 | 720' (690') - 1 |
| B | RVR 40 or 3/4 | RVR 50<br>or 1 | RVR 60 or 1 1/4 | | 120 | 740' (710') - 1 |
| C | | RVR 60<br>or 1 1/4 | 1 1/2 | | 140 | 740' (710') - 2 |
| D | | | | | 165 | 1020' (990') - 3 |

| | STRAIGHT-IN LANDING RWY 101 | | | CIRCLE-TO-LAND | |
|---|---|---|---|---|---|
| | ILS<br>DA(H) 293' (263') | LOC (GS out)<br>MO A(H) 480' (450') | | | |
| | FULL | RAIL or ALS out | RAIL out | ALS out | Max Kts | MO A(H) |
| A | RVR 24 or 1/2 | RVR 40 or 3/4 | RVR 24<br>or 1/2 | RVR 40<br>or 3/4 | RVR 50<br>or 1 | 90 | 720' (690') - 1 |
| B | | | | | 120 | 740' (710') - 1 |
| C | | | RVR 50<br>or 1 | RVR 60 or 1 1/4 | | 140 | 740' (710') - 2 |
| D | | | RVR 60<br>or 1 1/4 | 1 1/2 | | 165 | 1020' (990') - 3 |

KSPB
SCAPPOOSE INDUSTRIAL

JEPPESEN 15 DEC 06 (11-1)

SCAPPOOSE, OREG
LOC DME Rwy 15

— 190

| ASOS 135.87 | | PORTLAND Approach 124.35 | | SCAPPOOSE INDUSTRIAL UNICOM CTAF 122.8 | |
|---|---|---|---|---|---|
| LOC [FKO] 111.1 | Final Apch Crs 149° | Minimum Alt EDUME 1800' (1745') | MDA(H) 460' (405') | Apt Elev 55' TDZE 55' | |

MSA BTG VOR: 130° / 6200' / 300° / 3500'

MISSED APCH: Climbing LEFT turn to 5000' direct BTG VOR and hold.

Alt Set: INCHES | Trans level: FL 180 | Trans alt: 18000'

BRIEFING STRIP

METHODS AND SYSTEMS FOR EMPHASIZING SELECTED AVIATION CHART INFORMATION

BACKGROUND OF THE DISCLOSURE

The field of the invention relates generally to aircraft navigational systems and methods, and more specifically to systems and methods for emphasizing selected aviation or aeronautical chart data.

As an aircraft approaches its destination, much information is needed for the pilot to successfully navigate through an airspace surrounding an airport. The information needed by pilots operating under visual flight rules and instrument flight rules is different, and different versions of terminal charts are generally available for use by pilots operating under one set of rules or the other. In the United States, such charts are available, for example from NACO or Jeppesen.

Terminal charts for instrument flight rules contain a wealth of information stored in a compact form on a single image, whether provided on paper, electronically stored in computer readable form (e.g., a CD-ROM), or with an electronic display. The terminal charts may include a number of sections, some of which include a rather large amount of data arranged in tabular form, together with a map section for reference by a pilot. Such terminal charts are created for substantially universal use by pilots of different aircraft, and thus typically contain different sets of flight procedure data that correspond to different types or categories of aircraft, such as, for example, minimum altitude information for airplanes of different approach categories. As another example, the terminal charts include different sets of data for different airport runways for reference by the pilot. As such, the charts may include a substantial amount of data that contemplate various flight procedures and possibilities, a small portion of which will actually apply to a chosen flight procedure for execution by the pilot.

The large amount of information in the terminal charts tends to present difficulties for pilots to quickly find the applicable information actually needed for a particular approach. Sifting through rows and columns of data to locate the data needed can be cumbersome to say the least. Information contained in the flight chart, but not applicable to a specific flight procedure being executed, tends to clutter the chart and obscure the information relevant to the specific airplane being flown under a specific instrument approach.

BRIEF DESCRIPTION

An exemplary method of visually organizing an aviation chart, such as, for example only, a terminal chart for use by a pilot operating an aircraft under either Visual or Instrument Flight Rules (VFR or IFR) is disclosed. The method is to be executed by a processor based device, and the method comprises: accepting grouped data information each respectively corresponding to one of a plurality of flight procedures to be executed, the accepted grouped data information for the plurality of flight procedures being assembled into an aviation chart; accepting user-provided emphasis preferences for the accepted grouped data information to be included in the aviation chart; and applying the user-provided emphasis preferences to the accepted grouped data information in the aviation chart, thereby providing an enhanced aviation chart for the user.

Optionally, applying the user-provided emphasis preferences to the grouped data information in the terminal chart may comprise applying a first emphasis feature to a first selected grouped data information in the aviation chart, and applying a second emphasis feature to a second selected grouped data information in the aviation chart, wherein the emphasis features of the first and second grouped data information are different from one another. Accepting the emphasis preferences may comprise accepting color preferences for selected ones of the grouped data information, with the color preferences including at least one of a highlight color preference and an alphanumeric text color preference. Applying the user-provided emphasis preferences to the accepted grouped data information in the aviation chart may comprise distinguishing at least one grouped data information in the aviation chart with a color that is differentiated from another grouped data information in the aviation chart.

The grouped data information may be selected from the group of missed approach instructions, minimum approach information data, straight-in landing approach data, circle-to-land approach data, aircraft category data, ground speed data, approach profile data, map data, chart inset data, heading data, communication frequency data, flight procedure note data, and combinations thereof. The method may also comprise: accepting user provided de-emphasis preferences for data and information to be presented in the aviation chart; and applying the de-emphasis preferences to the aviation chart. Accepting user provided de-emphasis preferences may comprise accepting one of a terrain de-emphasis color and a water de-emphasis color for a map section of the aviation chart.

The method may further comprise providing the terminal chart to the user, which may comprise providing a hard copy of the aviation chart. Alternatively, the processor based device may include a display, and providing the terminal chart may comprise presenting the aviation chart on the display.

An exemplary method of enhancing a terminal chart for use by a pilot operating an aircraft is also disclosed. The method is to be executed by a processor based device, and the method comprises: accepting grouped data information each respectively corresponding to a plurality of flight procedures to be executed, the grouped data information for the plurality of flight procedures being assembled into a terminal chart; and selectively coloring, in response to user preferences, the accepted grouped data information to emphasize portions of the terminal chart.

Optionally, selectively coloring the grouped data information may comprise coloring the grouped data according to manually selected preferences of the user. Selectively coloring the accepted grouped data information may also comprise: identifying at least one of the accepted grouped data information; and distinguishing the identified accepted grouped data information with a differentiated background color or a differentiated text color. Selectively coloring may further comprise de-emphasizing, in response to user preferences, a portion of the terminal chart. De-emphasizing a portion of the terminal chart may comprise adjusting a terrain color or a water color in a map section of the terminal chart.

An exemplary system for providing aeronautical navigation information in the form of a terminal chart is also disclosed. The chart has grouped data information for a plurality of flight procedures to be executed. The system comprises: a processor based device; and at least one input device connected to the processor based device. The processor based-device is configured to accept grouped data information defining a terminal chart, the grouped data information being selected from the group of missed approach instructions, minimum approach information data, straight-in landing approach data, circle-to-land approach data, aircraft category data, ground speed data, approach profile data, map data, chart inset data, heading data, frequency data, procedure note data, and combinations thereof. The processor based device is configured to emphasize selected ones of the grouped data information with differentiating colors, thereby visually organizing the terminal chart.

Optionally, the processor based device is responsive to color preferences, that are manually input by the user with the input device, to provide the differentiated colors. The processor based device may further be configured to display the terminal chart. The processor based device may also be configured to de-emphasize selected ones of the grouped data information, thereby further visually organizing the terminal chart.

BRIEF DESCRIPTION OF THE DRAWINGS

Non-limiting and non-exhaustive embodiments are described with reference to the following Figures, wherein like reference numerals refer to like parts throughout the various views unless otherwise specified.

FIG. 4 illustrates an exemplary enhanced terminal chart portion generated by the system shown in FIG. 1, showing emphasized Category B approach data with other non-Category B approach data de-emphasized.

FIG. 5 illustrates an exemplary enhanced terminal chart portion generated by the system shown in FIG. 1, showing different emphasis straight-in landing approach data and circle-to-land approach data.

FIG. 6 illustrates an exemplary enhanced terminal chart portion generated by the system shown in FIG. 1, showing different emphasis for straight-in landing approach data, circle-to-land approach data, and Category B approach data with certain data de-emphasized.

FIG. 9 illustrates an exemplary enhanced terminal chart portion generated by the system shown in FIG. 1, showing a chart header including emphasized portions.

DETAILED DESCRIPTION

Figure 1:
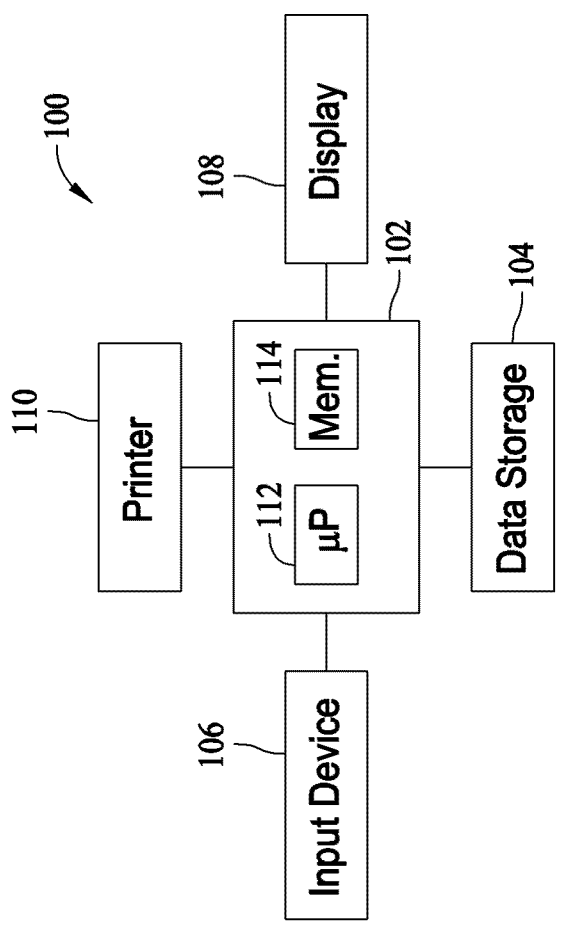
FIG. 1 is a schematic block diagram of an exemplary system for providing aeronautical navigation information in the form of a terminal chart.

Exemplary embodiments of systems and methods for providing aeronautical navigation information in the form of an aviation chart are disclosed below that facilitate information delivery to aircraft pilots in a more convenient and easier to read format. Certain portions of the aviation chart may be emphasized, or de-emphasized using, for example, distinguishing color attributes as desired so that the user may quickly select and focus on the most pertinent and presently applicable information in flight. That is, the aviation charts may be visually organized for the user's convenience by directing the user's attention toward or away from data and information in the aviation chart, resulting in a more focused and manageable set of data and information for reference by a plot, without removing any information from the aviation chart.

In order to appreciate the invention to its fullest extent, the following disclosure will be segmented into different parts: wherein Part I discusses the state of the art; and Part II discloses novel and advantageous systems and methods for generating enhanced, visually organized terminal charts, for reference by a user.

I. Introduction to the Invention

As noted previously, terminal charts for instrument flight rules contain a wealth of information stored in a compact form on a complex single image, whether provided on paper, electronically stored in computer readable form (e.g., a CD-ROM), or with an electronic display.

Landing approach information for aeronautical applications is typically depicted in one or more terminal charts presented to a user on a cockpit display or on paper charts to a pilot and/or co-pilot as generally pre-composed and non-interactive images. Known terminal charts may include a number of different sections, some of which include a rather large amount of data arranged in tabular form, together with a map section for reference by a pilot. A large volume of information in such a complex image can make it difficult to quickly find the information a pilot needs.

Terminal charts typically contain all approach minima related information which are applicable to a specific approach procedure, covering any applicable aircraft categories, any approach landing maneuvers, various missed approach climb gradients, and several component-out conditions of the airport facilities. As such, much of the information included in a terminal chart may not be actually needed by the user for a given flight, such as, for example only, minimum altitude information for airplanes of a different approach category, or runway information for a runway not being used during this approach.

Because of the nature of the terminal charts including information for various possibilities and situations that may or may not be presented in any given flight, and also information from which the pilot may sometimes choose, the pilot and/or co-pilot are required to visually and mentally digest and filter the non-relevant information out from that information that applies specifically to the operational situation at hand. For example, if the aircraft being flown is a category "C" aircraft, then the minima information pertaining to the category "A", "B" and "D" aircraft contained in the chart will not be needed by the pilot or co-pilot. Sifting through both relevant and irrelevant information for a specific flight procedure can significantly add to the cognitive workload of the pilot and/or co-pilot while the pilot and/or co-pilot are attempting to perform tasks, such as a landing approach, in the aircraft. Information that is not relevant to a specific flight procedure can seem like clutter to a pilot trying to find the information relevant to his specific airplane and to this specific instrument approach.

Various types of de-cluttering technology are known that attempt to present information to pilots and co-pilots in a more convenient form. While varying degrees of success has been achieved with known de-cluttering features and systems, lower cost solutions and more intuitive systems and methods for enhancing terminal charts are desired. Additionally, some ability to customize terminal charts to meet the needs of particular users, which conventional systems and methods do not provide, would be beneficial.

Conventionally, the format of the terminal charts has been static and unchangeable for the user. Existing chart viewing solutions show data in the terminal charts in a mostly black-and-white layout, with the alphanumeric test being presented in black against a white background. Rows and columns of data presented in such a manner can be difficult to distinguish and can be frustrating to certain users.

Color is sometimes used in existing terminal charts to indicate terrain, bodies of water, and most recently runway incursion hotspots. Color is currently only used in the "plan view" section of a chart, and not in the header, minimums, or profile sections of a chart. To the extent that color is used on the terminal charts at all, the colors currently used on a terminal charts, whether printed and published in hardcopy paper form or displayed in electronic form, are determined by the publisher(s) and not by the user.

II. Advantageous Systems and Methods of Providing Enhanced Terminal Charts

FIG. 1 schematically illustrates a system 100 for generating aviation charts, including but not necessarily limited to terminal charts, that advantageously provides a greater ability for information emphasis, de-emphasis, or visual organization using distinguishing color attributes, among other things, in different areas of the charts to more effectively allow users such as pilots and co-pilots to quickly and effectively distinguish needed data and information from other data and information contained in the terminal chart. In response to user-selected preferences, the system 100 generates enhanced, visually organized aviation charts for reference by a user as explained below. The system 100 beneficially allows for customization of aviation charts to meet the needs and preferences of particular users.

Referring now to FIG. 1, the exemplary system 100 includes, for example, a processor based device 102, a data storage element 104 associated with the device 102, an input device 106 for accepting user inputs to the device 102, and a display 108 associated with the device 102 for electronically presenting system outputs to a user. The system 100 may also include a printer 110 so that hard copies of system outputs, namely terminal charts, may be obtained for reference by a pilot, co-pilot or other user. Still other output devices are possible. For example, system outputs may be supplied to compact disks or other storage devices for electronic display or hardcopy printout using other computer systems.

The processor based device 102 may be, for example, a microcomputer or other processor-based device, such as, for example, a Multi-Function Display (MFD) or Electronic Flight Bag (EFB). The device 102 may include a microprocessor 112 and a memory 114 for storing instructions, algorithms and other information as required to function in the manner explained below. The memory 114 may be, for example, a random access memory (RAM), or other forms of memory used in conjunction with RAM memory, including but not limited to flash memory (FLASH), programmable read only memory (PROM), and electronically erasable programmable read only memory (EEPROM). The device 102 retrieves and saves information in the data storage element 104, which in various embodiments may correspond to disk storage, a hard drive, a database server or other storage elements familiar to those in the art. Information is stored in the data storage element 104 to assemble the various parts or sections of aviation charts, such as terminal charts or other aviation charts. As will be appreciated below, the information in the storage element 104 is stored and retrieved in related groups, referred to herein as grouped data and information in a manner familiar to those in the art. The grouped data and information may correspond, in one example, to a plurality of flight procedures to be executed under instrument rules, although in other embodiments the grouped data and information may be associated with other types of terminal charts such as terminal charts for flight procedures to be executed under visual flight rules, or still other types of charts including aeronautical information. The grouped data information in such charts is sometimes referred to as "boxes" in the aviation charts, and are stored, organized or arranged in the storage element 104 by location and type. Viewing software, such as JeppView available from Jeppesen Sanderson, Inc. or another provider, may be executed by the device 102 to retrieve and assemble the grouped data information into larger aviation chart images, including but not limited to complete terminal charts.

The input device 106, in different embodiments, may include a number of known input elements, such as a keyboard, a mouse, or a variety of input selector buttons, knobs, dials, etc. known in the art. The input device 106 may be integrated with the display 108 in certain embodiments using, for example, touch sensitive areas of a display screen. The input device 106 may also include interactive voice response (IVR) elements and devices for collecting user preferences and inputs for use by the device 102. The input device 106 may communicate with the processor based device 102 via hard wired paths or wireless mediums using known communication protocols. More than one input device 106 may be included in the system 100.

Various embodiments of the system 100 are contemplated. For example, the system 100 may be integrated into an aircraft 100 such that the display 100, for example, is an embedded cockpit display and the input device 106 includes one or more selectors provided on or near the cockpit of the aircraft.

In another embodiment, the system 100 may be configured as an aftermarket device that allows an existing aircraft to be retrofitted with the capabilities of the system 100 as described below. Alternatively, the system 100 may be configured as a portable, specific purpose device that may be carried aboard different aircraft by the same or different users. As still another example, the system 100 may be embodied on a general purpose computer such as a desktop, computer or a notebook computer. In yet another embodiment, the system 100 may be a web-based system delivering receiving user inputs and generating outputs in various forms based on the preferences of the user. Among the possibilities contemplated, for example, a user of a web-based system 100 may receive system outputs (e.g., terminal charts) for use and display over the Internet or other network, may download terminal charts to another computer system, may receive the terminal charts via electronic mail, may receive the reports via facsimile, or may obtain the terminal charts via any known medium according to user preference.

The processor based-device 102 is configured to accept grouped data information defining an aviation chart. As will be appreciated below, the grouped data information may be selected from the group of missed approach instructions, minimum approach information data, straight-in landing approach data, circle-to-land approach data, aircraft category data, ground speed data, approach profile data, map data, chart inset data, heading data, frequency data, procedure note data, and combinations thereof. The processor based device 102 is beneficially configured to emphasize selected ones of the grouped data information with differentiating colors, thereby visually organizing an aviation chart, such as a terminal chart, for reference by a pilot, co-pilot or other user.

More specifically, the processor based device 102 is responsive to color preferences, that are input by the user with the input device 106, to provide the differentiated colors. The processor based device may further be configured to present the aviation chart to the user via the display 108 and/or the printer 110. As will also become clear, the processor based device 102 may also be configured to de-emphasize selected ones of the grouped data information, thereby further visually organizing the aviation chart. How much color, and which shades of color to be used, may be matched to the subjective preferences of each user, such that different users may select terminal charts having different color emphasis and de-emphasis features. Dynamic color selection is therefore made available to users to meet specific needs and preferences.

As such, the system 100 allows the user to add color emphasis, or de-emphasis to desired portions of the aviation charts. Specifically, background and text color settings for their aviation charts may be chosen and selected by users to make the charts easier to read and quickly locate information. Important information to a particular user may be emphasized to his or her personal taste, and little used information or even un-needed information may be de-emphasized. Such emphasis or de-emphasis of grouped data information may be temporarily or permanently employed to visually organize complex areas of a an aviation chart for specific flight procedures to emphasize and de-emphasize certain information to specific users. For example, color can be used in a consistent way in terminal charts, such as always brightly highlighting missed approach procedures on all charts, or in a temporary way such as allowing the terrain coloring to be momentarily muted in order to read chart information that is difficult to see because of the strong terrain colors.

As described herein, visual organization of aviation chart information is specifically contrasted with known "de-cluttering" technology. Visual organization as described herein shall refer to presenting information in the terminal chart with specific emphasis or de-emphasis without removing any information from the chart, while de-cluttering is understood to refer to removal of information before it is presented to the user.

The benefits and advantages of the system 100 will now be demonstrated using exemplary portions or sections of a terminal chart for flight procedures to be executed under instrument flight rules, although other types of terminal charts or other aviation charts may likewise benefit from the concepts disclosed herein and may likewise be embodied in the system 100. The exemplary sections of the terminal charts will be described in relation to screen shot images of portions of a terminal chart represented by FIGS. 2-17 wherein a terminal chart is broken up into various "boxes", with each box having a different type (e.g., plan, profile, straight-in minimums, communication frequencies, etc.). Adding color attributes to these boxes, based on their type can make information recognition and location much more intuitive for users. Text and background colors, for example, may be changed on a box-by-box basis within the chart in response to user preferences. As color schemes are a significant component of the exemplary embodiments, color drawings are attached hereto as Appendix A for reference in relation to the color attributes of the disclosed embodiments that are not as evident in the non-color Figures.

Figures 2, 3:
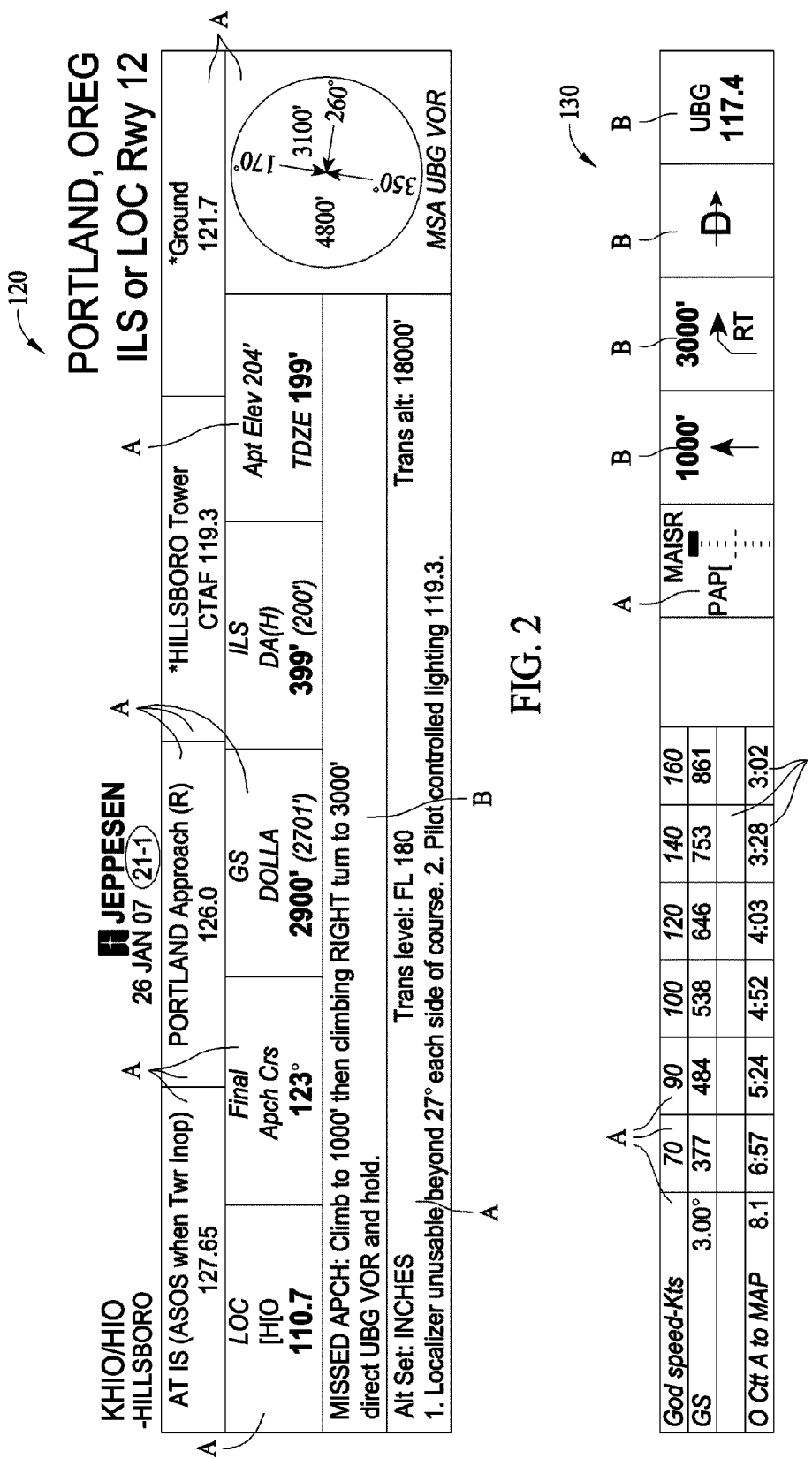
FIG. 2 illustrates an exemplary enhanced terminal chart portion generated by the system shown in FIG. 1, showing emphasized textual missed approach instructions.
FIG. 3 illustrates an exemplary enhanced terminal chart portion generated by the system shown in FIG. 1, showing emphasized iconic missed approach instructions.

FIGS. 2 and 3 illustrate exemplary missed approach instruction sections 120 and 130 generated by the system 100 (FIG. 1) for a terminal chart. The missed approach instructions are located in two different areas of the terminal chart and in two different forms, namely in the form of textual instructions (FIG. 2) are usually located in the header area of the chart, and in the form or an iconic short-hand missed approach procedure (FIG. 3) located below the profile view section of the chart. As shown in the examples of FIGS. 2 and 3, chart background coloring is used to emphasize, differentiate or distinguish certain areas of the chart portions. A simple way to think of chart background coloring is to compare it to using a highlighter pen to brighten a portion of a chart. A good example is highlighting the missed approach procedure on a chart so it can be quickly located when a pilot needs to discontinue the landing phase of his approach. For example, in FIGS. 2 and 3, the chart portions generally include a text color (e.g., black), a first background color A (e.g., white) for most of the boxes in the chart portion, and a second background color B (e.g., pink) to distinguish, differentiate and emphasize the missed approach information from the remainder of the information included in the chart portions. By presenting the different background color B, which the user may select, the missed approach instructions are emphasized and readily understood at a glance with much reduced cognitive effort compared to a conventional terminal chart having uniform text and background colors for all portions of the chart. Alternatively, in response to user preferences, the system 100 may allow the color of the text and icons to be changed on a box-by-box basis as an alternative to coloring a box background. It is also contemplated that a user may manually select text and icon color preferences in addition to background colors on a box-by-box basis.

Such color selection may also be used to de-emphasize certain information in the terminal chart. For example, changing the text color to a muted grey, for example, for certain text while leaving the remainder of the text color black is very useful for de-emphasizing a portion of a chart. Certain background colors may also be used for de-emphasis purposes.

By allowing the user to select preferences for the background colors A and B, as well as the text and icon colors, many variations of the terminal chart portions are possible that may appeal to different users. The resultant terminal charts may be more intuitive for users to read, and a likelihood of error may be decreased. The idea, of course, is to allow the user to quickly be able to identify and use the missed approach information during this high-workload, high risk portion of the flight.

FIG. 4 illustrates an exemplary Minimum Altitude Information section 140 of a terminal chart. This section often appears cluttered to many users, and the user needs to pull one number out of a possible dozen or so numbers to answer the question "how low can I go on this approach". Highlighting, as shown in FIG. 4, the minimum values that correspond to the approach speed category of aircraft the pilot flies (e.g., Category B in FIG. 4) focuses the attention on the values the user cares about. Thus, in the example shown, the Category B minimums are presented in a background color C (e.g., yellow), while the remainder of the chart section has the background color A (e.g., white), thus distinguishing the Category B minimums from the Category A, C and D minima that is also found the chart section 130. Further, the background color C is selected to be different from the background color B shown in FIGS. 2 and 3 to further demarcate and distinguish the different sections of the terminal chart.

FIG. 4 further illustrates that text in many of the boxes corresponding to Category A, C and D is de-emphasized by presenting them in a lighter shade of grey, as opposed to be black text in the Category B minimum boxes that are highlighted with the background color C in FIG. 4. The overall effect is to make the numbers that the pilot cares about stand out in the chart, while obscuring other information in the chart and reducing any likelihood of confusion by the user.

FIG. 5 illustrates another exemplary Minimum Altitude Information section 150 that has been enhanced by the system 100 (FIG. 1) in response to user selected color preferences. As is evident from FIG. 5, a pilot will be making either a straight-in or circle-to-land approach at the end of his flight. Coloring the background information for each of these areas of information makes for easy identification of the minimum information within each style of approach. In the example shown, the "straight-in landing boxes" are presented with the background color D (e.g., green) and the "circle-to-land" boxes are presented with the background color E (e.g., orange). The colors D and E may be different from any of the colors A, B and C in the other areas of the charts previously explained. The distinguished colors D and E permit a ready focus by the user on either one or the other sets of data.

FIG. 6 illustrates another exemplary enhanced Minimum Altitude Information section 160 generated by the system 100 (FIG. 1) in response to user preferences. The chart section 160 shows different emphasis for straight-in landing approach data with background color D, circle-to-land approach data with background color D, and Category B approach data with background color C, and certain data de-emphasized with muted grey text. As shown in FIG. 6, the colors D and E permit focus on one or the other of straight-in landing data and circle-to-land information, while the color C facilitates focus on a particular subset (e.g., Category B) of the information found in the straight-in landing data and circle-to-land data boxes.

Figure 7:
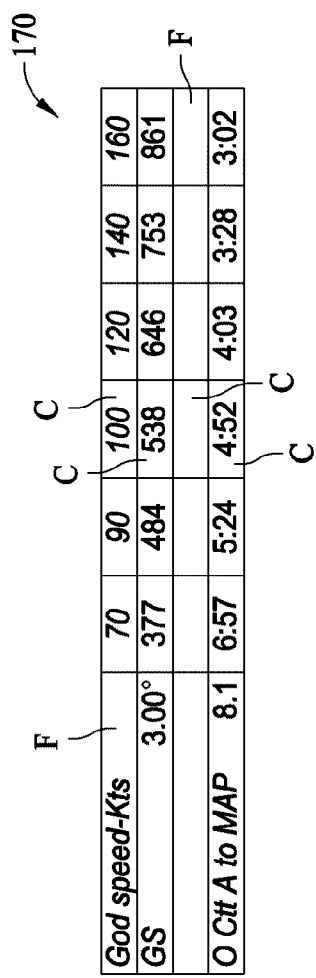
FIG. 7 illustrates an exemplary enhanced terminal chart portion generated by the system shown in FIG. 1, showing a ground speed data table with a portion of the data emphasized.

FIG. 7 illustrates an exemplary enhanced ground speed table section 170 generated by the system 100 (FIG. 1), in response to user-selected color preferences. The ground speed table shows you how many feet-per-minute you will need to descend to stay on the glide slope, and how long it will take to get to the missed approach point. As FIG. 7 illustrates, it may be desirable to highlight an expected ground speed column (e.g., 100 knots), that has been targeted for a given approach, with a background color C (e.g., yellow) to make it easily identifiable from the other columns in the table that are presented with a background color F (e.g. grey). The text in the other table columns presented with the background color F, however, is not de-emphasized, since the actual ground speed in any given flight could be slower or faster than the expected ground speed and this data may also be needed for reference. In the example shown in FIG. 7, the whole ground speed table has been presented with the background color F (e.g., light grey) to make it stand out from other sections of the chart.

Figure 8:
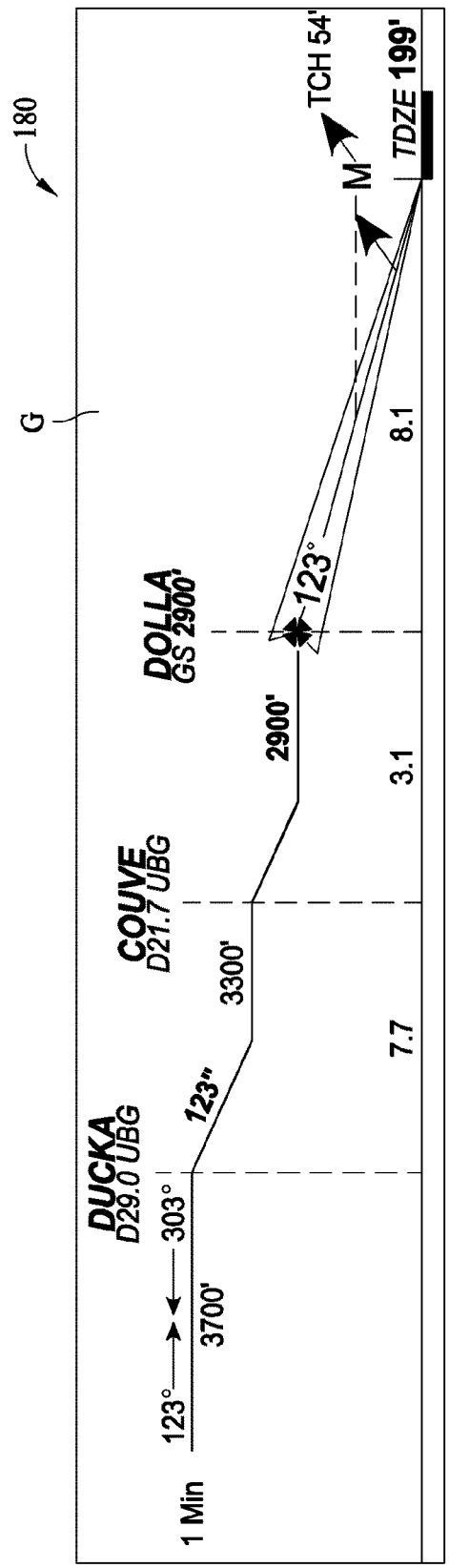
FIG. 8 illustrates an exemplary enhanced terminal chart portion generated by the system shown in FIG. 1, showing a profile view that has been emphasized.

FIG. 8 illustrates an exemplary enhanced profile section 180 of a terminal chart generated by the system 100 (FIG. 1) in response to user-selected color preferences. In the example shown, the profile section 170 includes a background color G (e.g., a sky-like light blue) in order to visually separate it from the rest of the sections of the terminal chart.

FIG. 9 illustrates an exemplary enhanced header section 190 of a terminal chart generated by the system 100 (FIG. 1) in response to user preferences. As seen in FIG. 9, the header area of a terminal chart contains a lot of information densely packed into one area, in many distinct boxes. The header section can generally be divided into the following types of fields: communication frequencies, navigation frequencies, heading information, altitude information, minimum safe altitude circle, missed approach instructions, and notes and miscellaneous information. Different background colors can be assigned to each of these types of header fields. In the example shown, various boxes are presented with distinct background colors, including some or all of the colors A, B, C, D, E, F, and G discussed above and still other colors as desired. It is recognized that some users may not desire to color every box as in the example shown, but only some of the boxes. It is up to the chart user to determine how much color differentiation is needed or desirable, and what those colors should be.

It is contemplated that when a consistent set of colors is used in the header section 190, the customer will start associating specific color boxes with the corresponding specific type of information. For example, dark pink boxes may become instantly recognizable to a customer as where to quickly find communication frequency information.

Figure 10:
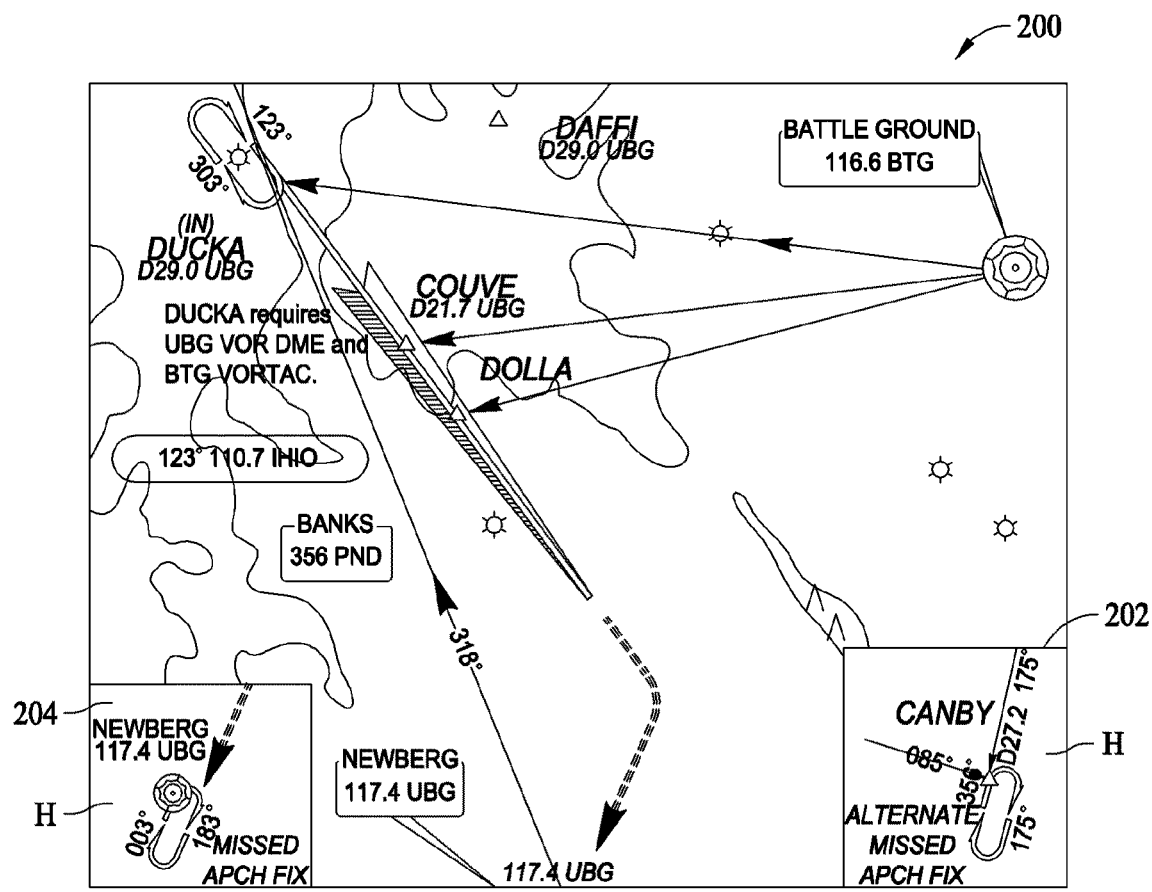
FIG. 10 illustrates an exemplary enhanced terminal chart portion generated by the system shown in FIG. 1, showing a plan view map portion with emphasized map insets.

FIG. 10 illustrates an exemplary plan view inset section 200 of a terminal chart generated by the system 100 (FIG. 1) in response to user preferences. As shown, the plan view inset section 100 may contain different scale or location map insets 202 and 204, showing portions of the map outside the area of the plan view. These insets 202 and 204 may be used for showing holding fixes, or missed approach fixes, or other map info of interest. Presenting these plan view inset boxes with different background shading H than the remainder of the chart section makes it very obvious that this is a separate disjoint section of chart from the main plan view.

Figure 11:
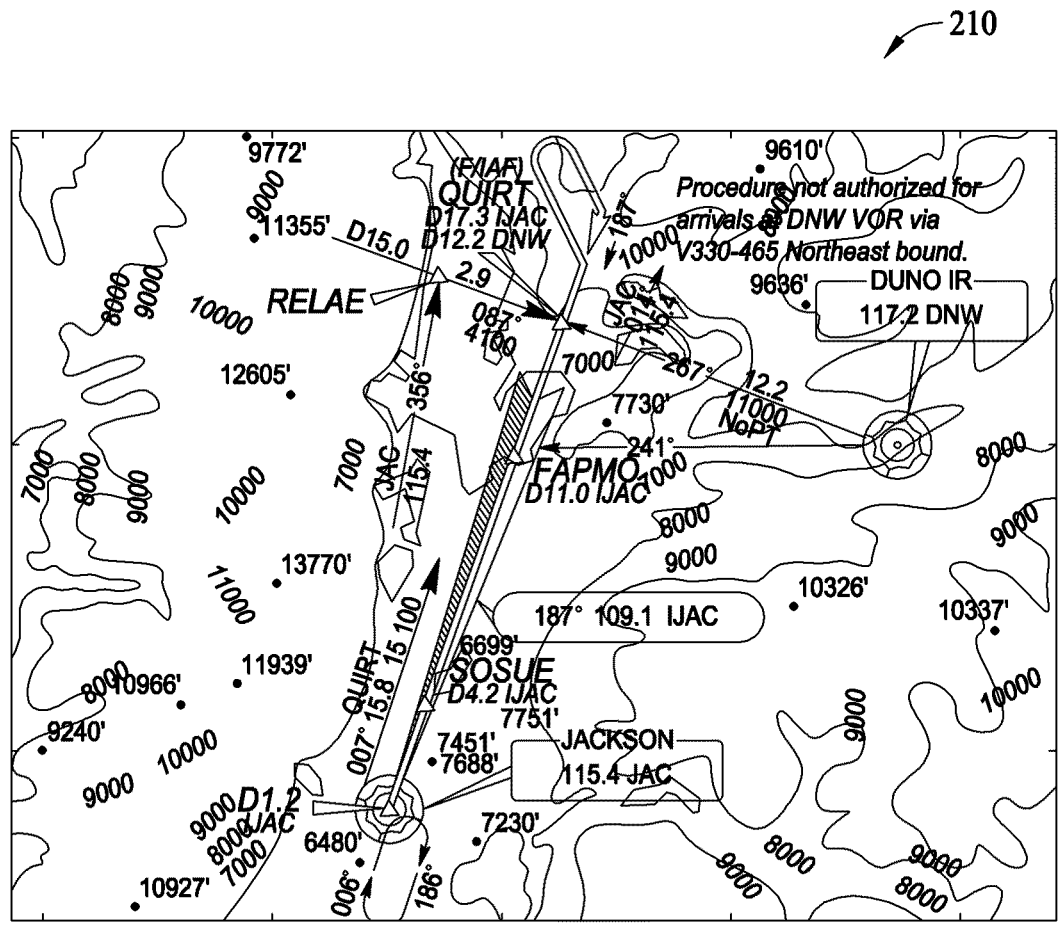
FIG. 11 illustrates an exemplary terminal chart portion generated by the system shown in FIG. 1, showing a plan view map portion with terrain contours and shading.
Figure 13:
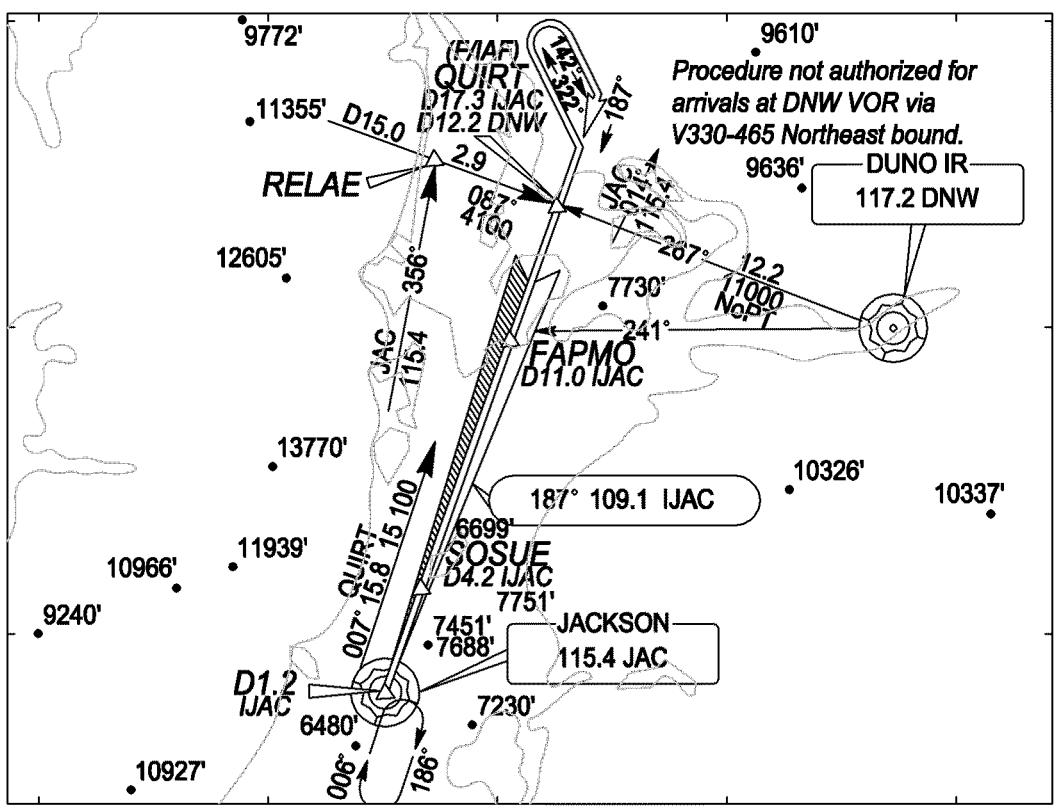
FIG. 13 illustrates another enhanced version, generated by the system shown in FIG. 1, of the terminal chart portion shown in FIG. 11 with terrain features de-emphasized.

FIG. 11 illustrates an exemplary plan view section 210 of a terminal chart generated by the system 100 (FIG. 1) prior to enhancement with user selected color preferences. As shown in FIG. 11, the plan view section contains a map depicting the geographical area that the approach chart covers, including terrain and topography features and water features. Conventionally, plan view sections are the only portions of terminal charts where color is often used. In existing terminal charts, terrain colors are carefully chosen to identify elevation, and water color is substantially standardized. As also evident from FIG. 11, standard symbology and geo-spatial relationships between objects are overlaid on the plan view with text and symbols. The terrain topography and water colors underlying the text and symbols tends to obscure the text and symbols making portions of the plan view difficult to read. FIG. 13 illustrates another enhanced version, generated by the system shown in FIG. 1, of the terminal chart portion shown in FIG. 11 with terrain features de-emphasized. Many charts contain terrain contours and shading in the plan view. Often the terrain colors can cause route depictions, obstacles, or terrain contour labels to be hard to read.

Figure 12:
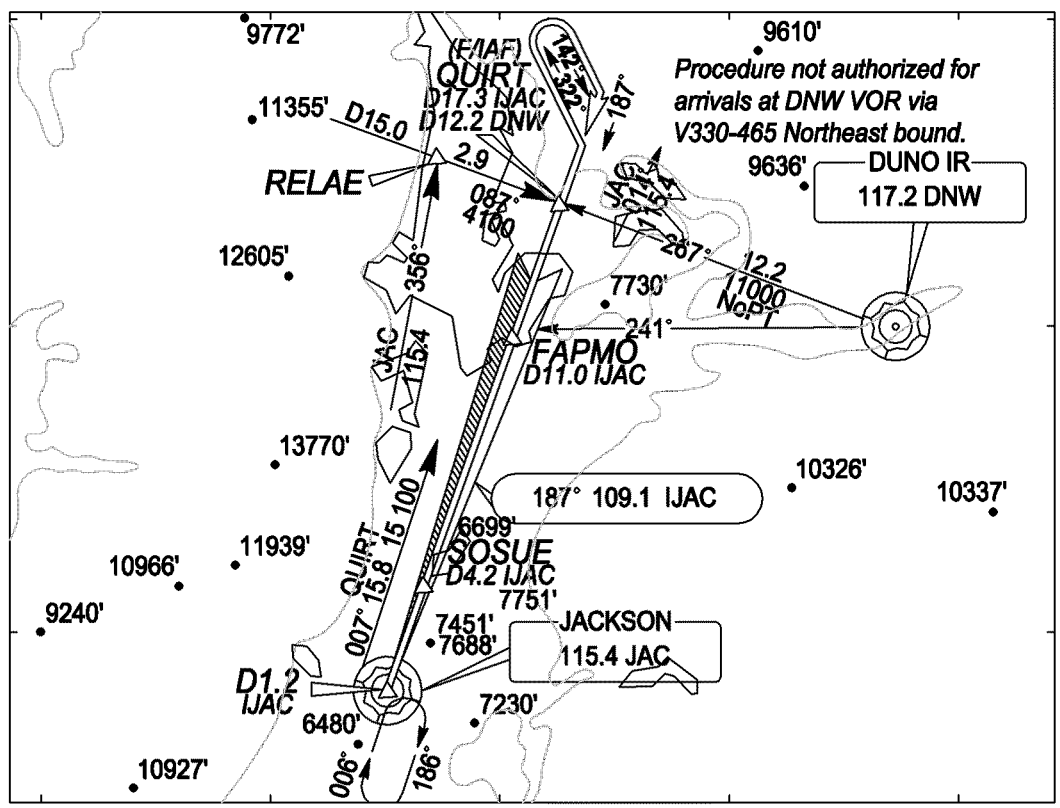
FIG. 12 illustrates an enhanced version, generated by the system shown in FIG. 1, of the terminal chart portion shown in FIG. 11 with terrain features de-emphasized.

For readability and visual organization purposes, FIG. 12 illustrates a plan view section 220 of a terminal chart with terrain features de-emphasized so that the information contained in the plan view section can be more readily appreciated by the user. Comparing FIGS. 11 and 12, it is noted that they contain exactly the same information. The text and/or symbols have not been moved or altered, but by changing the colors for the terrain topography in the map to colors having increased contrast with the text/symbols, which may be selected by the user, the text and/or symbols are much more readable over the terrain portions of the map. The terrain topography features of the map are still present, but are faded in relation to the text and symbols.

Still further variations are possible to visually organize the plan view and improve readability of the plan view sections, as discussed briefly below in relation to FIGS. 13-17. Specific information of interest to a user can be emphasized with user-selected colors while other text and/or symbols can be de-emphasized with muted colors.

FIG. 13 illustrates another exemplary plan view section 230 of the terminal chart wherein both terrain and water features in the map section have been de-emphasized with lighter colors to improve chart readability. The terrain and water features of the map are still present, but are faded in relation to the text and symbols.

Figure 14:
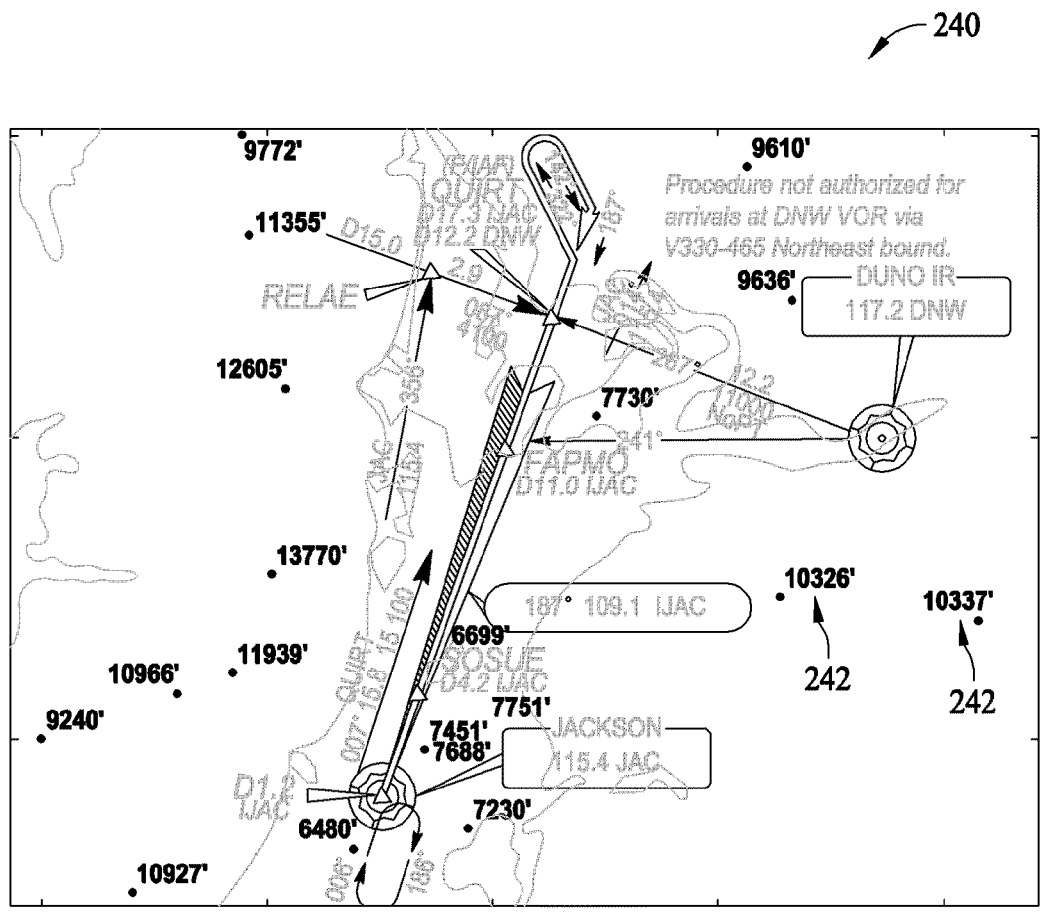
FIG. 14 illustrates a further enhanced version, generated by the system shown in FIG. 1, of the terminal chart portion shown in FIG. 13 data features emphasized and de-emphasized.

FIG. 14 illustrates another exemplary plan view section 240 of the terminal chart wherein plan view altitudes 242 in the plan view are emphasized by presenting them in a different color (e.g., red) as opposed to a traditional black color, with other text and symbols in the map section being de-emphasized with muted colors.

Figure 15:
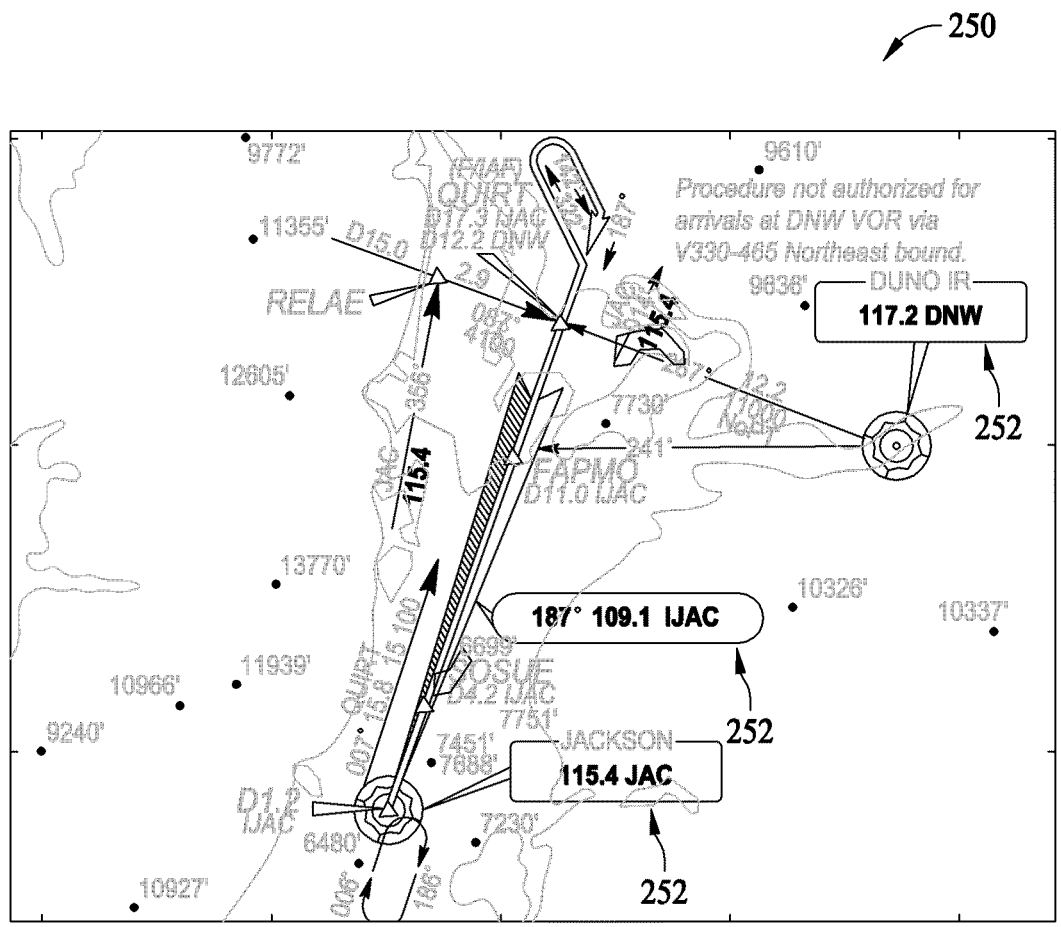
FIG. 15 illustrates a further enhanced version, generated by the system shown in FIG. 1, of the terminal chart portion shown in FIG. 13 data features emphasized and de-emphasized.

FIG. 15 illustrates another variation of a plan view section 250 of the terminal chart wherein navigation frequencies 252 in the plan view section are emphasized by presenting them in a different color (e.g., red) as opposed to a traditional black color, with other text and symbols in the map section being de-emphasized with muted colors, such as a grey color.

Figure 16:
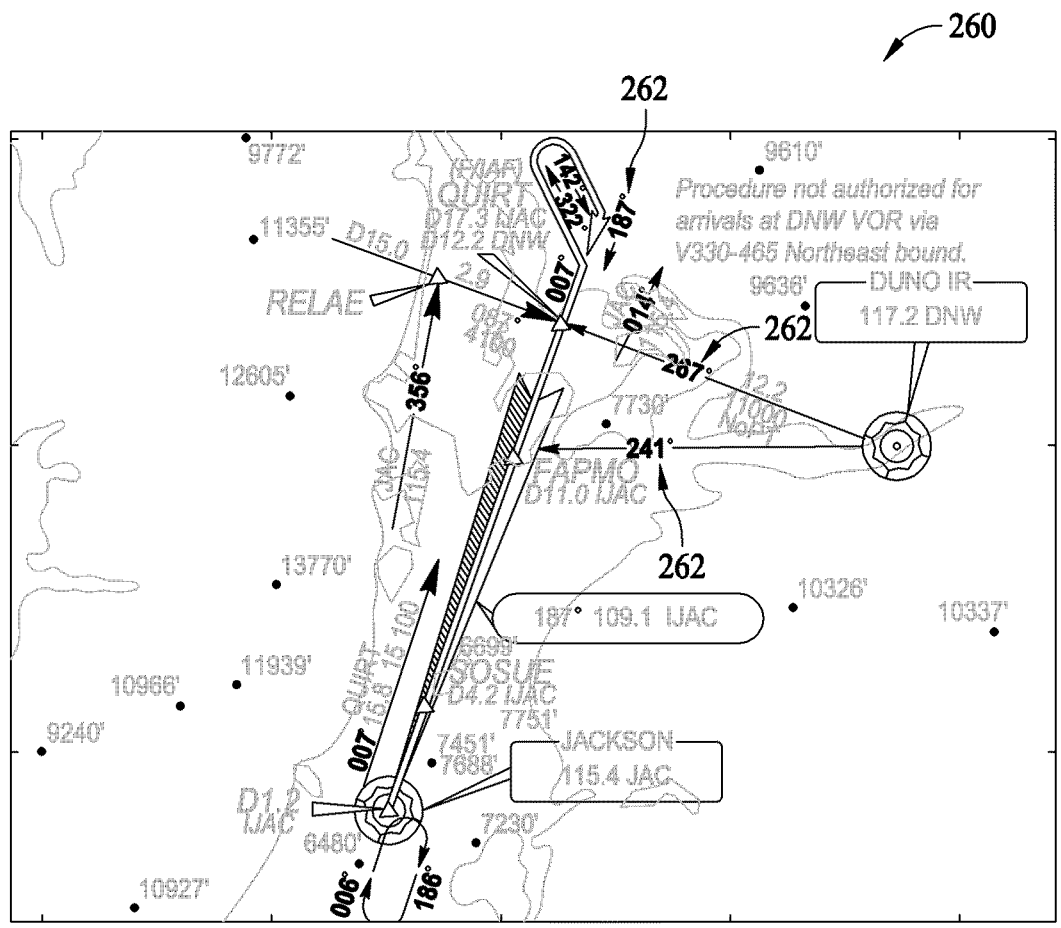
FIG. 16 illustrates a further enhanced version, generated by the system shown in FIG. 1, of the terminal chart portion shown in FIG. 13 data features emphasized and de-emphasized.

FIG. 16 illustrates another variation of a plan view section 260 of the terminal chart wherein route headings 262 are emphasized by presenting them in a different color (e.g., red) as opposed to a traditional black color, with other text and symbols in the map section being de-emphasized with muted colors, such as a grey color.

Figure 17:
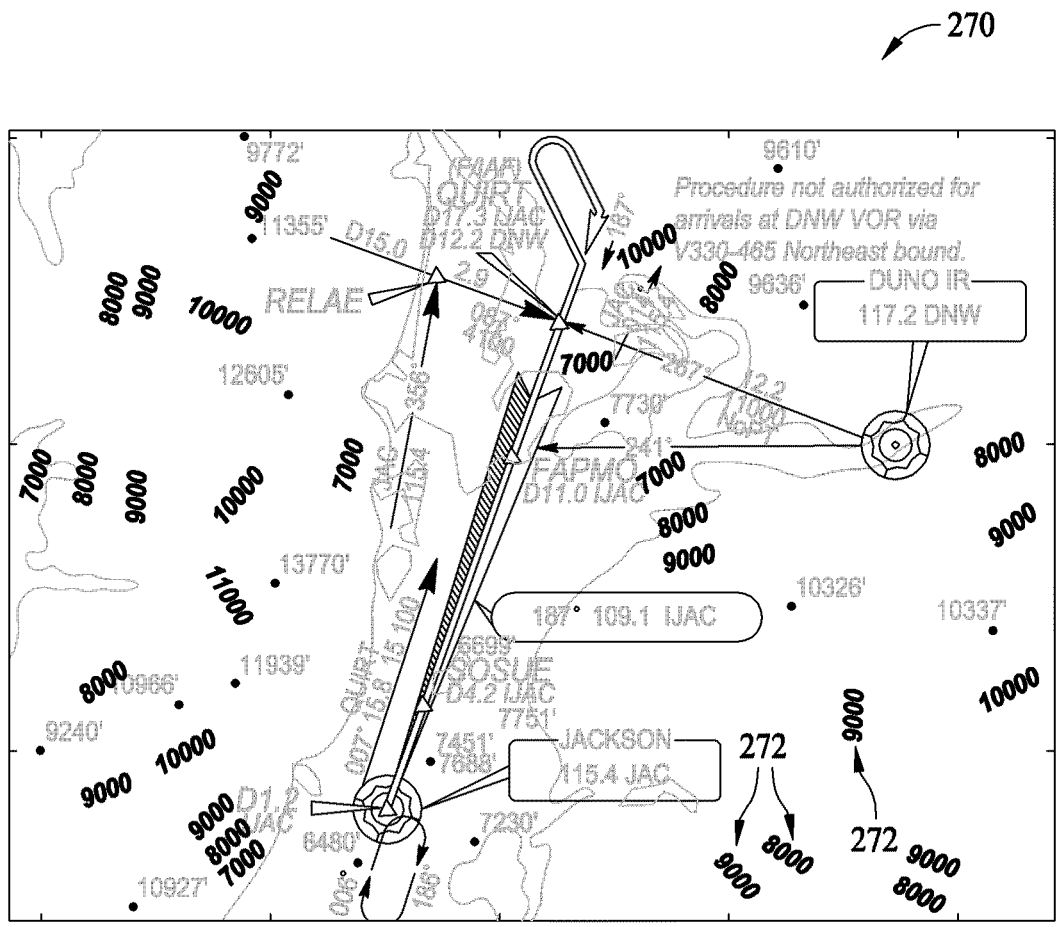
FIG. 17 illustrates a further enhanced version, generated by the system shown in FIG. 1, of the terminal chart portion shown in FIG. 13 data features emphasized and de-emphasized.

FIG. 17 illustrates another variation of a plan view section 270 of the terminal chart wherein terrain contours 272 are emphasized by presenting them in a different color (e.g., red) as opposed to a traditional black color, with other text and symbols in the map section being de-emphasized with muted colors, such as a grey color.

Emphasis of plan view text and symbols via background coloring is possible but perhaps undesirable for most users, except possibly for toning-down a large amount of white background that may render any given chart too bright for night viewing on an electronic display.

It is contemplated that the plan view sections of FIGS. 12-17 may be especially advantageous when viewed on an electronic display wherein manipulations of the plan view for emphasis or de-emphasis may be temporarily selected by the user for short term use or momentary visual organization, while preserving the ability of the user to view the original, full plan view again without any emphasis or de-emphasis features. As such, and for example, if the geographical features are of primary interest at any given moment, the user may prefer to have the full terrain and water colors displayed. That is, the various color emphasis or de-emphasis features may be toggled on or off by the user as desired while in-flight. The system 100 can flexible respond on demand only when the user desires emphasis, or de-emphasis of designated plan view information.

The above-described emphasis or de-emphasis features could be selectable by the user separately and independently with a plurality of input selectors, or may be combined with a reduced number of input selectors to simplify the user interface. As one example, all the plan view emphasis/de-emphasis features described above could be selectable with a single button in a manner such that with each successive press of a button another emphasis or de-emphasis feature would be activated. In such an example, the screens of FIGS. 11-17 could be cycled through and presented to a user with each successive press of a button.

Figure 18:
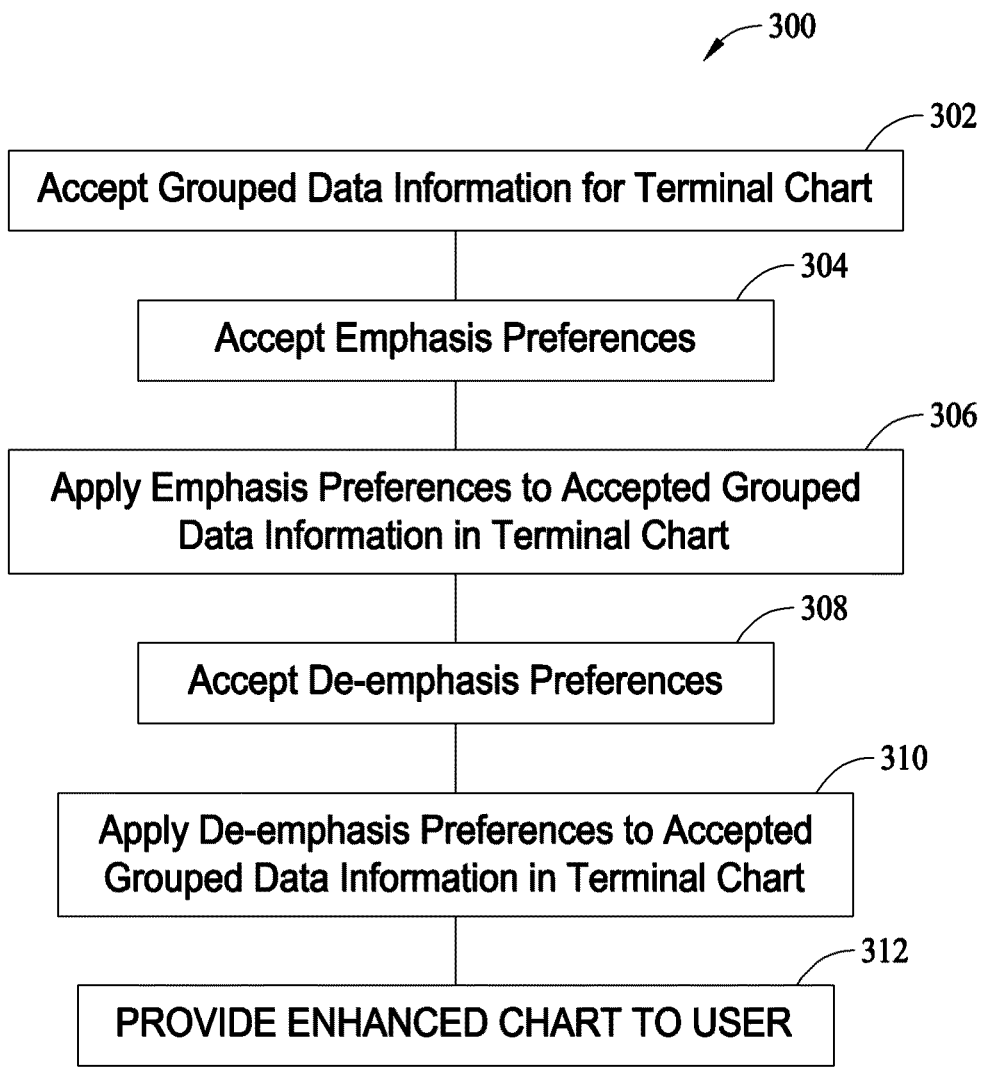
FIG. 18 illustrates a first exemplary flowchart of a method, executable by the system shown in FIG. 1, for enhancing a terminal chart.

FIG. 18 illustrates a first exemplary flowchart of a method 300, executable by the system 100, and more specifically the processor based device 102 shown in FIG. 1, for visually organizing a terminal chart. As discussed above, the system 100 may be configured to generate a terminal chart for use by a pilot operating an aircraft under instrument flight rules. The method 300 includes, as shown in FIG. 18, accepting 302 grouped data information each respectively corresponding to one of a plurality of flight procedures to be executed under instrument flight rules. The accepted grouped data information for the plurality of flight procedures may later be assembled into a terminal chart, and includes at least the information disclosed above in relation to FIGS. 2-17. The information may be accepted 302 in any manner known in the art.

As seen in FIG. 18, the method also includes accepting 304 user-provided emphasis preferences for the accepted grouped data information to be included in the terminal chart, and applying 306 the user-provided emphasis preferences to the accepted grouped data information in the terminal chart, thereby providing an enhanced terminal chart for the user. It is contemplated that the system 100 may present a number of setup options to the user for collection and acceptance of user emphasis preferences. Through the setup procedures, the user may select which aspects of the sections of the terminal chart he or she desires to emphasized, how it is to be emphasized (e.g., background color or text color changes), what colors should be used, etc. After a setup routine is successfully run and the preferences are collected and accepted by the system, the system may automatically apply them until the setup routine is again run for a user to select new preferences or adjust previously selected ones. Restrictions on certain color choices or other emphasis preferences may be implemented if desired to ensure at least a minimum degree of readability in the charts. That is, in some embodiments the system 100 could reject and refuse to accept certain combinations of selected preferences proposed by a user.

As explained above, applying the user-provided emphasis preferences 306 to the grouped data information in the terminal chart may comprise applying a first emphasis feature to a first selected grouped data information in the terminal chart, and applying a second emphasis feature to a second selected grouped data information in the terminal chart, wherein the emphasis features of the first and second grouped data information are different from one another. Non-limiting examples of such application are described above in relation to FIGS. 2-17. Accepting the emphasis preferences may includes accepting color preferences for selected ones of the grouped data information, with the color preferences including at least one of a highlight color preference and an alphanumeric text color preference as discussed in relation to FIGS. 2-9. Applying the user-provided emphasis preferences to the accepted grouped data information in the terminal chart may include, as discussed above, distinguishing at least one grouped data information in the terminal chart with a color that is differentiated from another grouped data information in the terminal chart.

As FIGS. 2-17 demonstrate, the grouped data information may be selected from the group of missed approach instructions, minimum approach information data, straight-in landing approach data, circle-to-land approach data, aircraft category data, ground speed data, approach profile data, map data, chart inset data, heading data, communication frequency data, flight procedure note data, and combinations thereof.

Referring again to FIG. 18, the method 300 may further include accepting user provided de-emphasis preferences 308 for data and information to be presented in the terminal chart, and applying 310 the de-emphasis preferences to the terminal chart. Accepting user provided de-emphasis preferences may include accepting one of a terrain de-emphasis color and a water de-emphasis color for a map section of the terminal chart as discussed in relation to FIGS. 10-17 or de-emphasizing text as discussed in relation to FIGS. 4 and 6 above.

The method also includes providing 312 the terminal chart to the user. As mentioned above, this may entail printing the terminal chart including all accepted user preferences and providing a hard copy of the terminal chart, presenting the terminal chart on the display including all user accepted preferences, or still other forms known in the art.

Figure 19:
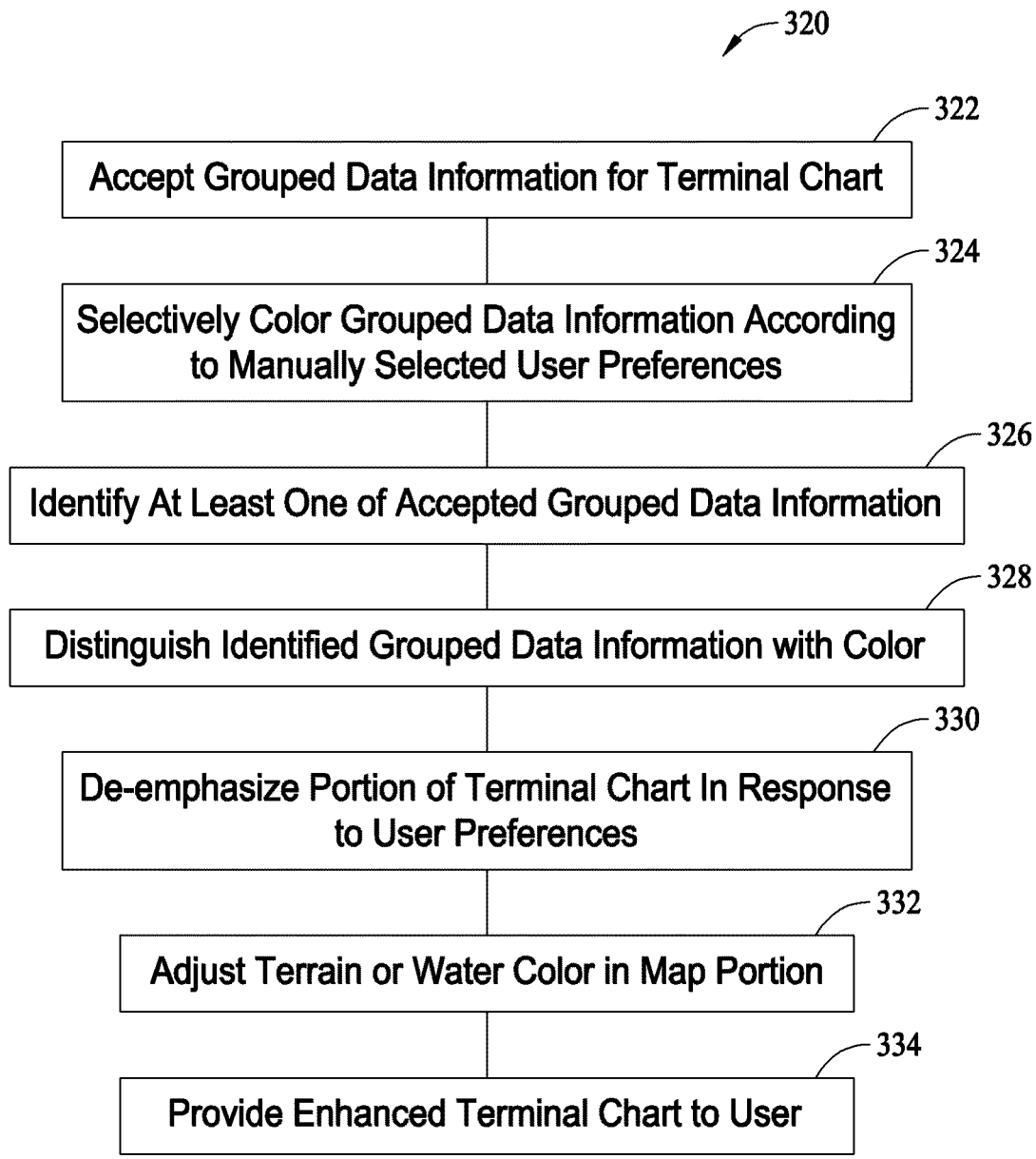
FIG. 19 illustrates a second exemplary flowchart of a method, executable by the system shown in FIG. 1, for enhancing a terminal chart.

FIG. 19 illustrates a second exemplary flowchart of a method 320, executable by the system shown in FIG. 1, and more specifically the processor based device 102 (FIG. 1) for enhancing a terminal chart. The terminal chart may be for use by a pilot operating an aircraft under instrument flight rules. The method includes accepting 322 grouped data information each respectively corresponding to a plurality of flight procedures to be executed under instrument flight rules, with the grouped data information for the plurality of flight procedures being ready for assembly into a terminal chart. The method 320 also includes selectively coloring 324, in response to user preferences, the accepted grouped data information to emphasize portions of the terminal chart. Selectively coloring 324 the grouped data information may include coloring the grouped data according to manually selected preferences of the user on a user-by user basis to provide customized terminal charts, or may alternatively include defaulting to pre-set colors for different emphasis or de-emphasis features when the features are selected by a user. That is, in different embodiments, the user may select both an emphasis/de-emphasis feature and a corresponding color preference to implement the feature, or may alternatively select only an emphasis/de-emphasis feature without a choice of colors in which it may be implemented. In such embodiments a user may have absoluter control of how much emphasis/de-emphasis is provided, but varying degrees of control over exact colors to be used for emphasis/de-emphasis.

As shown in FIG. 19, the method 320 may include, in response to the user supplied preferences, identifying 326 at least one of the accepted grouped data information, and distinguishing 328 the identified accepted grouped data information with a differentiated background color or a differentiated text color such as in the examples described above.

Selectively coloring may also include de-emphasizing 330, in response to user preferences, a portion of the terminal chart. De-emphasizing a portion of the terminal chart may include adjusting 332 a terrain color or a water color in a map section of the terminal chart, or any of the other de-emphasis features described above.

The chart may be provided 334 to the user in any form desirable, including the printed environment (i.e. via JeppView), in the on-board tablet or laptop computer environment, and in the embedded flight display environment.

It is now believed that the benefits and advantages of the invention have been amply demonstrated, and that those in the art could implement the concepts described without further explanation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of visually organizing an aviation chart onboard an aircraft, the aviation chart including a first portion that includes a first plurality of objects and a first background, the aviation chart further including a second portion that includes a second object and a second background, the method executed by a processor based device, the method comprising:

receiving, from a pilot, an emphasis preference for a particular object, the emphasis preference configured to be applied after a missed approach of a defined flight path of the aircraft;

selecting, by the processor, a group of related objects based on the particular object, the group of related objects being selected from the first plurality of objects;

accepting the group of related objects, the accepted group of related objects being assembled into the aviation chart;

accepting the emphasis preference for the accepted group of related objects and the particular object to be included in the aviation chart;

accepting a pilot-provided de-emphasis preferences for data and information to be presented in the aviation chart;

identifying, by the processor, a triggering event, the triggering event indicating that the aircraft has missed the approach; and in response to identifying the triggering event:

automatically applying the emphasis preference to the accepted group of related objects and the particular object in the aviation chart without user intervention, thereby providing an enhanced aviation chart for the pilot, wherein applying the emphasis preference includes applying a first color to the first background, wherein the first color facilitates emphasizing the particular object and a first set of the group of related objects; and automatically applying the pilot-provided de-emphasis preferences to the aviation chart, wherein applying the user-provided de-emphasis preferences includes applying one of the first color or a second color to a second set of the group of related objects, wherein the first color or the second color de-emphasizes the second set of the group of related objects, and applying a third color to the second background, wherein the third color facilitates de-emphasizing the second object.

2. The method of claim 1, wherein accepting emphasis preferences comprises accepting color preferences for selected ones of the group of related objects and the particular object, the color preferences including at least one of a highlight color preference and an alphanumeric text color preference.

3. The method of claim 1, wherein applying the pilot-provided emphasis preferences to the accepted group of related objects and the particular object in the aviation chart comprises distinguishing the group of related objects and the particular object in the aviation chart with a color that is differentiated from another group of objects in the aviation chart.

4. The method of claim 1, wherein the aviation chart comprises missed approach instructions.

5. The method of claim 1, wherein accepting pilot-provided de-emphasis preferences comprises accepting one of a terrain de-emphasis color and a water de-emphasis color for a map section of the aviation chart.

6. The method of claim 1, wherein providing the aviation chart comprises providing a hard copy of a terminal chart.

7. The method of claim 1, wherein the processor based device includes a display, and wherein providing the aviation chart comprises presenting the aviation chart on the display.

8. The method of claim 1, further comprising:
identifying, by the processor, a second triggering event, the second triggering event indicating that the aircraft has reached an end of a particular part of the defined flight path; and
in response to identifying the second triggering event:
automatically un-applying the emphasis preference to the accepted group of related objects and the particular object in the aviation chart; and
automatically un-applying the pilot-provided de-emphasis preferences to the aviation chart.

9. The method of claim 1, wherein the aviation chart further comprises two or more of the following: aircraft category data, ground speed data, approach profile data, map data, chart inset data, heading data, communication frequency data, and flight procedure note data.

10. A method of enhancing objects in a terminal chart onboard an aircraft for use by a pilot operating the aircraft, the terminal chart including a first portion that includes a first set of objects and a second portion that includes a second set of objects, the method executed by a processor based device, the method comprising:
receiving, from the pilot, an emphasis preference for a particular object, the emphasis preference configured to be applied after a missed approach of a defined flight path of the aircraft;
selecting a group of related objects based on the particular object, the group of related objects being selected from the first set of objects;
accepting the group of related objects, the group of related objects corresponding to a plurality of flight procedures to be executed, the group of related objects being assembled into the terminal chart;
identifying, via a processor, a triggering event, the triggering event indicating that the aircraft has missed the approach; and
in response to identifying the triggering event:
automatically selectively coloring, via the processor in response to the emphasis preference, the group of related objects and the particular object to emphasize the first set of the accepted data information; and
automatically selectively coloring, via the processor in response to the emphasis preference, the second set of objects to de-emphasize the second set of objects.

11. The method of claim 10, wherein selectively coloring the group of related objects and the particular object comprises:
identifying the group of related objects and the particular object; and
distinguishing the identified group of related objects and the particular object with a differentiated color.

12. The method of claim 10, wherein selectively coloring the second set of objects comprises adjusting a terrain color or a water color in a map section of the terminal chart.

13. A system for providing aeronautical navigation information in a terminal chart onboard an aircraft, the terminal chart having data information for a plurality of flight procedures executed under instrument rules, the terminal chart including a first portion that includes a first plurality of objects and a first background, and wherein the terminal chart further includes a second portion that includes a second object and a second background, the system comprising:
at least one input device; and
a processor based device communicatively coupled to said at least one input device, the processor based device programmed to:
receive, from a pilot, an emphasis preference for a particular object, the emphasis preference configured to be applied after a missed approach of a defined flight path of the aircraft;
selecting a group of related objects based on the particular object, the group of related objects being selected from the first plurality of objects;
accept the group of related objects in the terminal chart, the group of related objects being selected from the terminal chart comprising missed approach instructions;
identifying a triggering event, the triggering event indicating that the aircraft has missed the approach; and
in response to identifying the triggering event:
automatically apply a first color to the first background, wherein the first color facilitates emphasizing the group of related objects and the particular object;
automatically apply one of the first color or a second color to a second set of the first plurality of objects, wherein the first color or the second color de-emphasizes the second set of the first plurality of objects; and
automatically apply a third color to the second background, wherein the third color facilitates de-emphasizing the second object.

14. The system of claim 13, wherein the processor based device is further programmed to display the terminal chart.

* * * * *